Oct. 3, 1967        J. W. THOMAS        3,345,626
COMBINE PHOTOELECTRIC WARNING SYSTEM
Filed Dec. 24, 1964        3 Sheets-Sheet 1

INVENTOR.
JUNIOR W. THOMAS,
BY
Berman, Davidson & Berman
ATTORNEYS.

Oct. 3, 1967  J. W. THOMAS  3,345,626
COMBINE PHOTOELECTRIC WARNING SYSTEM
Filed Dec. 24, 1964  3 Sheets-Sheet 2
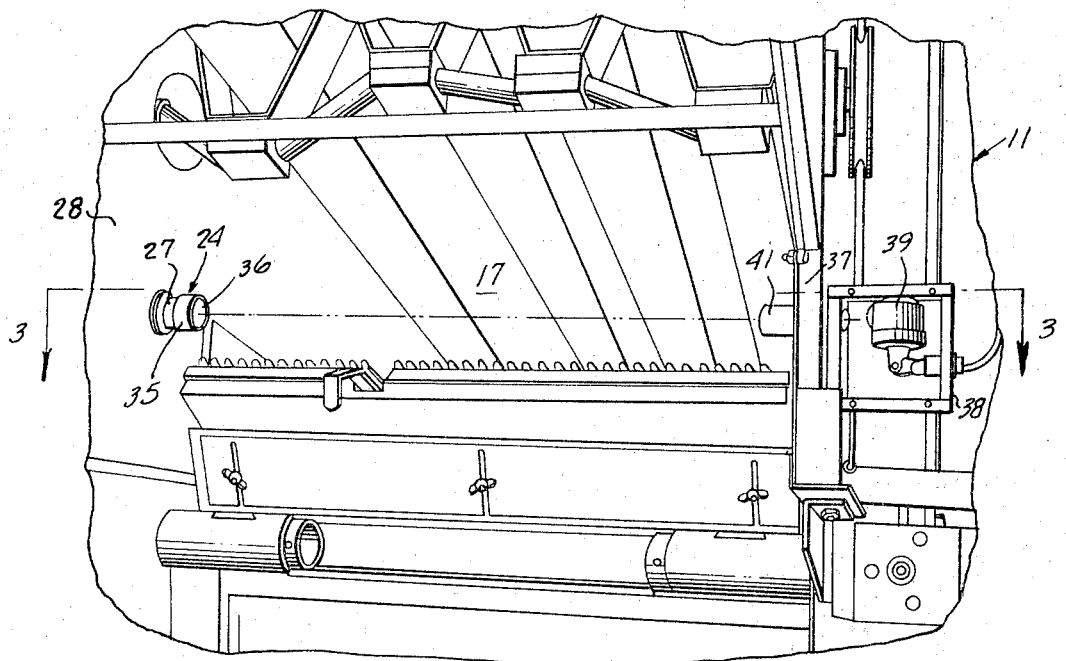
FIG. 2.
FIG. 3.
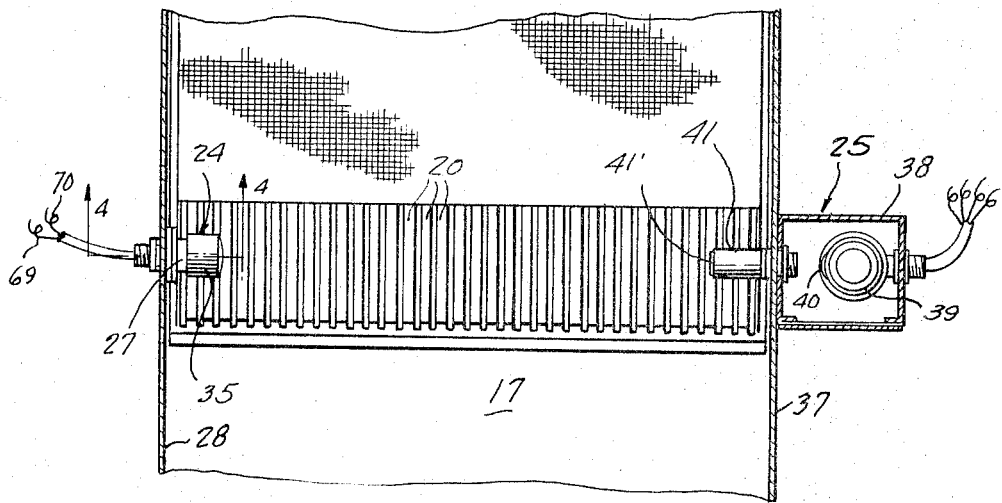
INVENTOR.
JUNIOR W. THOMAS,
BY
Berman, Davidson & Berman
ATTORNEYS.

Oct. 3, 1967   J. W. THOMAS   3,345,626
COMBINE PHOTOELECTRIC WARNING SYSTEM
Filed Dec. 24, 1964   3 Sheets-Sheet 3

INVENTOR.
JUNIOR W. THOMAS,
BY
Berman, Davidson & Berman
ATTORNEYS.

United States Patent Office 3,345,626
Patented Oct. 3, 1967

3,345,626
COMBINE PHOTOELECTRIC WARNING SYSTEM
Junior W. Thomas, Rural Free Delivery, Prescott,
Wash. 99348
Filed Dec. 24, 1964, Ser. No. 420,892
3 Claims. (Cl. 340—236)

ABSTRACT OF THE DISCLOSURE

A chaff-flow monitoring device for a harvesting machine consisting of a source of light and a photocell mounted on opposite sides of the chaff-flow passage of the machine to project a light beam through the moving chaff material to the photocell. The photocell controls a double-throw relay. An alarm device is connected in an energizing circuit with a selecting switch and the contacts of the relay. The selecting switch can be set in a first position to give an alarm when the chaff flow is too heavy, or in a second position to give an alarm when the chaff flow is too light.

---

This invention relates to monitoring devices, and more particularly means to monitor the flow of chaff through a harvesting machine.

When harvesting wheat and other crops, it is necessary that the chaff cobs and stems be suspended by a combination of a wind blast from the shoe fan and the shaking action of the shoe. The chaff and other debris are in that way floated out to the rear portion of the combine, and the seed is allowed to fall through to the sieve portion and be saved. When a situation exists which causes the chaff and other debris to bunch and cease to float, the seed cannot be separated and is carried out through the rear of the machine with the chaff and hence is lost. Such situations may be caused by too fast ground speed, uneven stands of grain, the combine being out of level, a strong tail wind which tends to neutralize the shoe fan wind blast, a malfunction of the fan or shoe driving means, such as slipping belts or the like, or such as when the shoe fan intake is blocked with straw or when the shoe sieve is plugged which stops the passage of the wind, or when harvesting down steep hills where the attitude of the combine is such that the chaff is expelled in an uphill direction.

A main object of the present invention is to provide a means to constantly measure the density of the material coming off the shoe of the combine so that when the density of the material coming off the shoe becomes so great as to create the possibility of loss of seed, a warning signal is given which indicates to the operator that proper action must be taken to correct the undesired condition and to allow for the correct suspension and floating off of the chaff.

A further object of the invention is to provide a means such as above mentioned which may be employed in a converse manner, namely, may be used to indicate too little material being delivered to the shoe of the combine, whereby a faster ground speed may be used.

A still further object of the invention is to provide an improved photoelectric warning system for monitoring the density of the material passing through a combine, the system involving relatively simple components, being easy to install, and being reliable in operation.

A still further object of the invention is to provide an improved photoelectric monitoring system for use with a combine to indicate overloading and underloading of the system, enabling the operator of the associated combine to maintain the most efficient ground speed together with the assurance that all the grain being handled by the combine is saved, whereas without such monitoring action, the grain might be lost from overloading or underloading the combine.

A still further object of the invention is to provide an improved photoelectric monitoring system for use with a combine to indicate overloading or underloading in the combine, the system being adjustable so that it may be used with a wide range of conditions and with a wide range of crops to be harvested.

Further objects and advantages of the invention will become apparent from the following description and claims, and from the accompanying drawings, wherein:

FIGURE 2 is an enlarged fragmentary elevational view taken on the line 2—2 of FIGURE 1 and showing the relative locations of the light source and the photoelectric cell in the monitoring system of FIGURE 1.

FIGURE 3 is a horizontal cross sectional view taken substantially on the line 3—3 of FIGURE 2.

Figure 1:
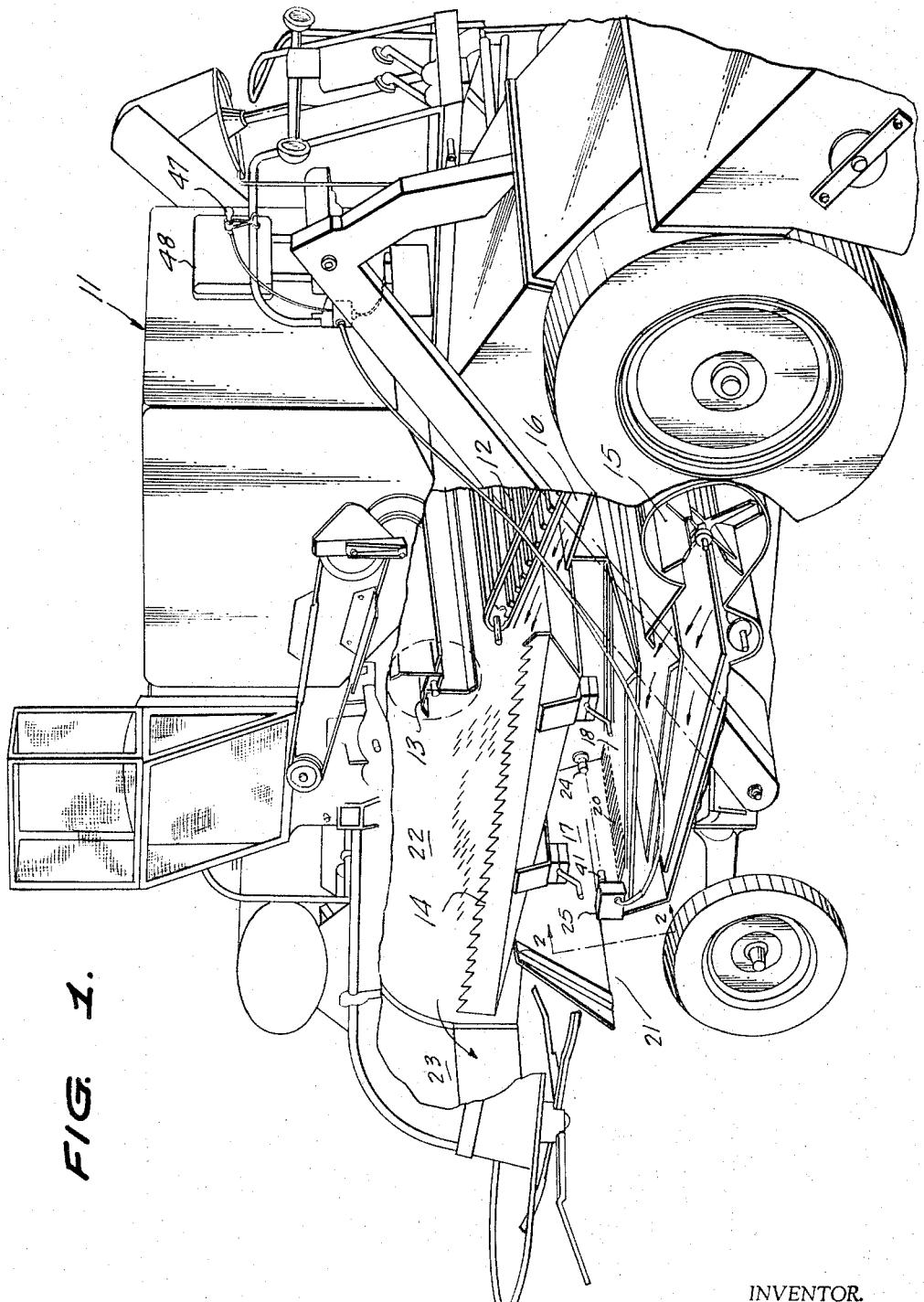
FIGURE 1 is a fragmentary perspective view of a conventional combine equipped with an improved monitoring system constructed in accordance with the present invention.

Referring to the drawings, 11 generally designates a conventional harvester which includes a raddle 12 over which harvested material is blown toward a beater assembly 13, through a blast of air generated by a fan assembly and flowing through a passage 16 toward the space immediately above the straw walkers 14. This last-named air blast winnows the grain, aiding separation and beginning the cleaning operation. Grain and chaff drop through the straw walkers 14 into the space 17 over an end shaker shoe 18 for finish cleaning, being subjected to a blast of air from a fan assembly 15 which passes upwardly through the entire shoe area and through slots 20 and carries the separated chaff from the space 17 toward a chaff discharge passage 21. Under normal conditions of operation there is a steady movement of substantially uniformly distributed chaff material through the passage 22 defined above the straw walkers 14 toward an outlet 23, and similarly there is a substantially steady, uniformly distributed moving mass of chaff material in the lower space 17 leading to the chaff discharge outlet 21.

Figure 4:
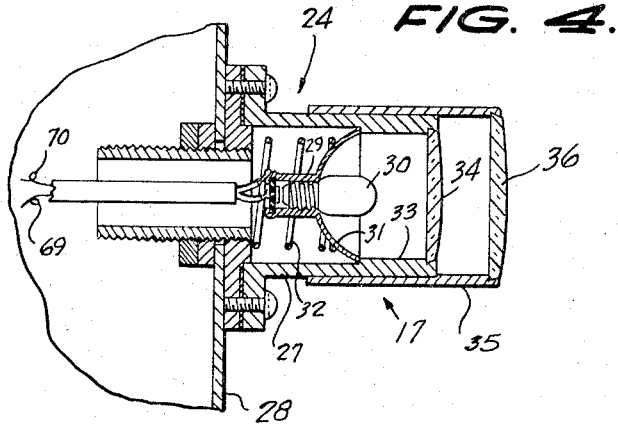
FIGURE 4 is an enlarged cross sectional detail view taken substantially on the line 4—4 of FIGURE 3.

In accordance with the present invention, the loading of the harvester is monitored by the provision of means to measure and to detect abnormalities in the movement of the chaff material either in the lower space 17 leading to the discharge outlet 21 or in the upper space 22 leading to the discharge outlet 23. Thus, in the typical arrangement illustrated in the drawings, a light source, designated generally at 24, is mounted at one side of the space 17, said light source projecting a beam of radiation toward photo-sensitive means, designated generally at 25, mounted at the other side of the space 17, the beam of light from the source traversing the space 17 and crossing the path of travel of the moving chaff material blown through said space. Thus, as shown in FIGURES 3 and 4, the assembly 24 comprises an annular housing 27 secured to one side wall 28 of the chamber 17, the housing 27 containing a lamp socket 29 containing a lamp 30, the socket 29 including an integral reflector portion 31 which is engaged by one end of a coiled spring 32 mounted in the housing 27 concentrically with the socket, biasing the socket so that its reflector portion 31 is held against the annular shoulder defined by a reduced bore portion 33 provided in the forward end of the housing 27. Mounted in the rim of the forward end portion of housing 27 is a lens 34, and mounted over the housing 27 is a cylindrical barrel 35 carrying an infrared filter 36 at its forward end, the filter 36 being interposed in the path of the light passing through lens 34 from lamp 30.

The photo-sensitive unit 25 is mounted on the opposite wall 37 of chamber 17, in the path of the radiation from the light source assembly 24, being arranged to receive such radiation through the moving material passing toward the discharge outlet 21 of space 17. The photo-sensitive unit 25 comprises a housing 38 mounted on the wall 37, said housing having mounted therein a photo cell assembly 39 located so that its light-receiving window portion 40 faces the end of a tubular light-receiving barrel member 41 mounted in the wall 37 in axial alignment with the light source housing 27 and provided with a protective lens 41', so that a beam of light from the lamp 30 is directed through lens 34 and filter 36 into the guide barrel 41 and thence to the light-receiving window 40 of the photo cell unit 39.

The photo cell unit 39 is of conventional construction and may be a unit similar to that identified by the trade name "Ray-O-Cell Photo Control," model C1–112. This unit includes a photo cell 42 arranged to control a relay 43, the relay having a pole 44 engageable with a lower contact 45 when the relay is deenergized and engageable with an upper contact 46 when the relay is energized. A signal lamp 47 is mounted in a suitable visible position in front of or adjacent to the operator's seat 48 of the harvester. The harvester is provided with a storage battery 48 having one terminal grounded, as shown at 49, and having the ungrounded lead wire 50. Alternating current is generated by means of a conventional inverter 51, the input to the inverter 51 being provided by means of wires 52 and 53 connected across the battery 48, and the output from the inverter being supplied by means of wires 54 and 55 through the primary winding of a transformer 56. The photo cell-relay unit 39 is energized from the secondary winding 58 of transformer 56 by suitable wiring, not shown, one terminal of the secondary winding 58 being grounded, as shown at 60, and the other terminal being connected through a protective fuse 57 and a wire 61 to the relay pole 44. A single pole, double-throw selector switch 62 is provided adjacent the operator's seat 48, said switch having the pole 63 and the respective stationary contacts 64 and 65, selectively engageable by pole 63. Contact 64 is connected by a wire 66 to the upper relay contact 46 and contact 65 is connected by a wire 67 to the lower relay contact 45.

One terminal of the lamp 30 is grounded, as by a wire 69 and the other terminal of the lamp is connected by a wire 70 to the pole 71 of a second single pole, double-throw selector switch 72 mounted adjacent the operator's seat 48. The switch 72 has respective contacts 73 and 74, selectively engageable by the pole 71. Contact 73 is connected through a wire 75 and a manually adjustable rheostat 76 to the battery wire 50. The contact 74 is likewise connected by a wire 77 and another manually adjustable rheostat 78 to said battery wire 50.

Figure 5:
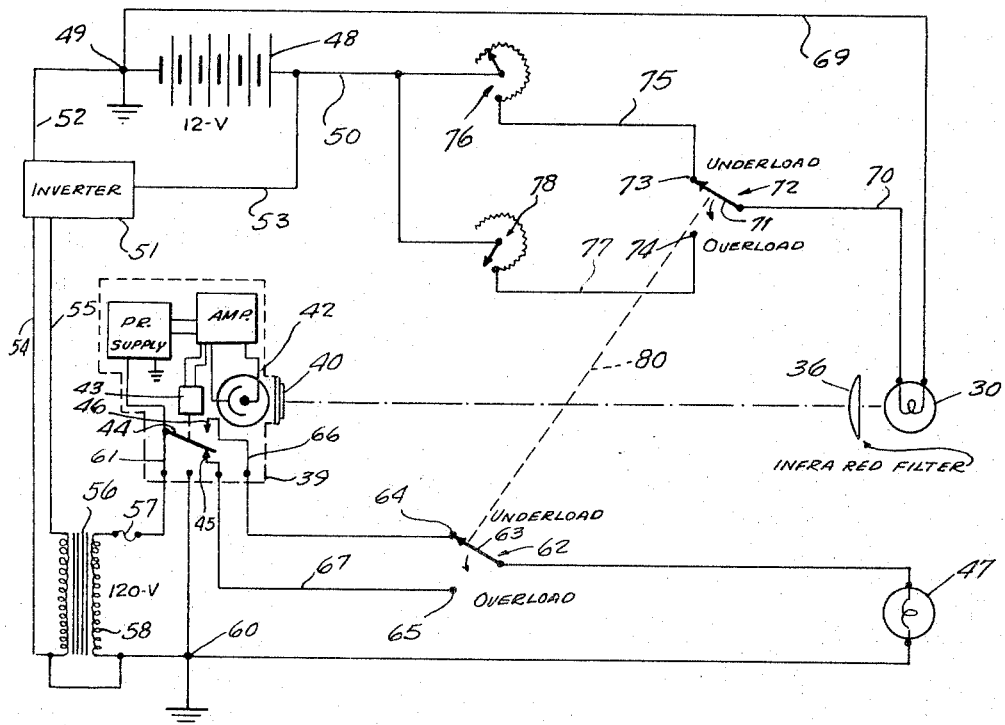
FIGURE 5 is a schematic wiring diagram showing the electrical connections of the photoelectric monitoring system of FIGURES 1 to 4.

The switches 72 and 62 are operable so that they can be set to monitor the harvester for either "underload" or "overload" conditions. With the switches set in the "underload" monitoring positions, as shown in FIGURE 5, the rheostat 76 is adjusted to provide a predetermined degree of energization of the lamp 30 such that under normal loading conditions of the harvester 11, insufficient light reaches the photo cell 42 to cause the relay 43 to become energized. However, if the rate of flow of the chaff material between the lamp 30 and the photo cell 42 diminishes below a predetermined level, the photo cell 42 will receive sufficient light to energize the relay 43 and cause pole 44 to engage contact 46, thereby causing the lamp 47 to become energized. With switches 72 and 62 set in the "Underload" monitoring positions, the energization of the warning lamp 47 thus indicates to the operator of the harvester that the machine is underloaded, whereby he may take suitable corrective action, such as increasing the ground speed of the harvester.

Similarly, if the switches 72 and 62 are set in their "overload" monitoring positions, and the rheostat 78 is suitably adjusted, the lamp 30 is energized to a suitable level to provide a light beam which, when passing through the normal flow of chaff material in the space 17, is of sufficient remaining intensity to maintain the relay 43 energized. However, if the amount of material passing through the passage 17 increases above a predetermined density, the light beam is sufficiently attenuated to cause relay 43 to become deenergized, whereupon pole 44 engages its lower contact 45, resulting in the energization of the lamp 47, which notifies the operator of the vehicle that excessive chaff material is present in the passage 17 or that the chaff material is non-uniform in its distribution (causing a flickering indication of the lamp 47). Upon seeing the overload indication provided by the lamp 47, the operator may then reduce the ground speed of the harvester, or take whatever other corrective action is necessary.

The switch poles 71 and 63 may be suitably ganged together, if so desired, as diagrammatically indicated by the reference numeral 80, so that they can be operated simultaneously.

As previously mentioned, the monitoring system may be employed either in the passage 17, as illustrated in the drawings, or alternatively may be mounted in a similar manner in the chaff flow passage 22 leading to the chaff discharge outlet 23.

As previously mentioned, the limits for causing energization of the lamp 47, namely, the limiting overload or underload conditions, can be established by the adjustment of the rheostats 76 and 78, which determine the normal degree of energization of lamp 30 and hence the amount of light which reaches the photo cell 42 under normal loading conditions. As will be readily understood, with lighter loads there is less obstruction to the light passing from lamp 30 to photo cell 42, whereby relay 43 receives more energizing current, and conversely, under heavy loading conditions the light beam between lamp 30 and photo cell 42 is much more obstructed, reducing the current in the relay 43.

The infra-red filter 36 is employed to eliminate the effects of stray light and to minimize the effects of variations in the intensity of the ambient light. Furthermore, the manually adjustable rheostats 76 and 78 may also be suitably calibrated to compensate for different lighting conditions, such as operation under daytime conditions and under nighttime conditions.

While the monitoring device has been described and illustrated in association with a harvester having a passage through which material is blown by an air blast, this monitoring device can also be used in a harvester employing conveyor means other than air blasts, so long as the material being conveyed is fluffy in nature and its flow can be measured by variations in intensity of a light beam passing through it.

While a specific embodiment of an improved means for monitoring overload and underload conditions in a harvester has been disclosed in the foregoing description, it will be understood that various modifications within the spirit of the invention may occur to those skilled in the art. Therefore, it is intended that no limitations be placed on the invention except as defined by the scope of the appended claims.

What is claimed is:
1. In combination with a harvester having a passage through which chaff material is blown by an air blast and having a chaff discharge outlet at the end of said passage, load-monitoring means comprising a light source at one side of said passage, a photo cell at the other side of said passage located to receive radiation from said light source traveling through the moving material, the intensity of the received radiation varying substantially inversely with the density of the moving material, a relay controlled by said photo cell, said relay having a pole and upper and lower contacts engageable thereby respectively responsive to energization and deenergization of said relay, a first circuit branch including said pole and the upper contact, a second circuit branch including said pole and the lower contact, a source of current, an alarm device, and means to selectively connect said alarm device to said source either through said first circuit branch or said second circuit branch, whereby the relay can operate to energize the alarm device responsive either to a predetermined increase or decrease from a normal value of the intensity of the radiation received by said photo cell.

2. In combination with a harvester having a passage through which chaff material is blown by an air blast and having a chaff discharge outlet at the end of said passage, load-monitoring means comprising a radiation source at one side of said passage, radiation-sensing means at the other side of said passage located to receive radiation from said source traveling through the moving material, the intensity of the received radiation varying substantially inversely with the density of the moving material, a relay controlled by said radiation-sensing means, said relay having a pole and upper and lower contacts engageable thereby respectively responsive to energization and de-energization of said relay, a first circuit branch including said pole and the upper contact, a second circuit branch including said pole and the lower contact, a source of current, indicating means, and means to selectively energize the indicating means from said source either through said first circuit branch or said second circuit branch, whereby the relay can operate to energize the indicating means responsive either to a predetermined increase or decrease from a normal value of the intensity of the radiation received by said radiation-sensing means.

3. The structural combination of claim 2, and wherein said radiation source emits radiation including infrared, and infra-red filter means mounted between said source and said radiation-sensing means.

References Cited

UNITED STATES PATENTS

| | | | |
|---|---|---|---|
| 1,851,215 | 3/1932 | Schunemann | 250—218 X |
| 1,994,768 | 3/1935 | Holven et al. | 250—218 X |
| 2,209,158 | 7/1940 | Goldsmith | 317—124 X |
| 2,275,833 | 3/1942 | Adams | 317—124 X |
| 2,974,255 | 3/1961 | Platzer et al. | |
| 3,028,501 | 4/1962 | Lamparter | 250—218 |
| 3,033,036 | 5/1962 | Leisen | 88—14 X |

NEIL C. READ, *Primary Examiner.*

D. K. MEYER, *Assistant Examiner.*